Dec. 23, 1941.                B. F. ALLEN                2,267,487
                            ICE FISHING LURE
                          Filed June 24, 1940
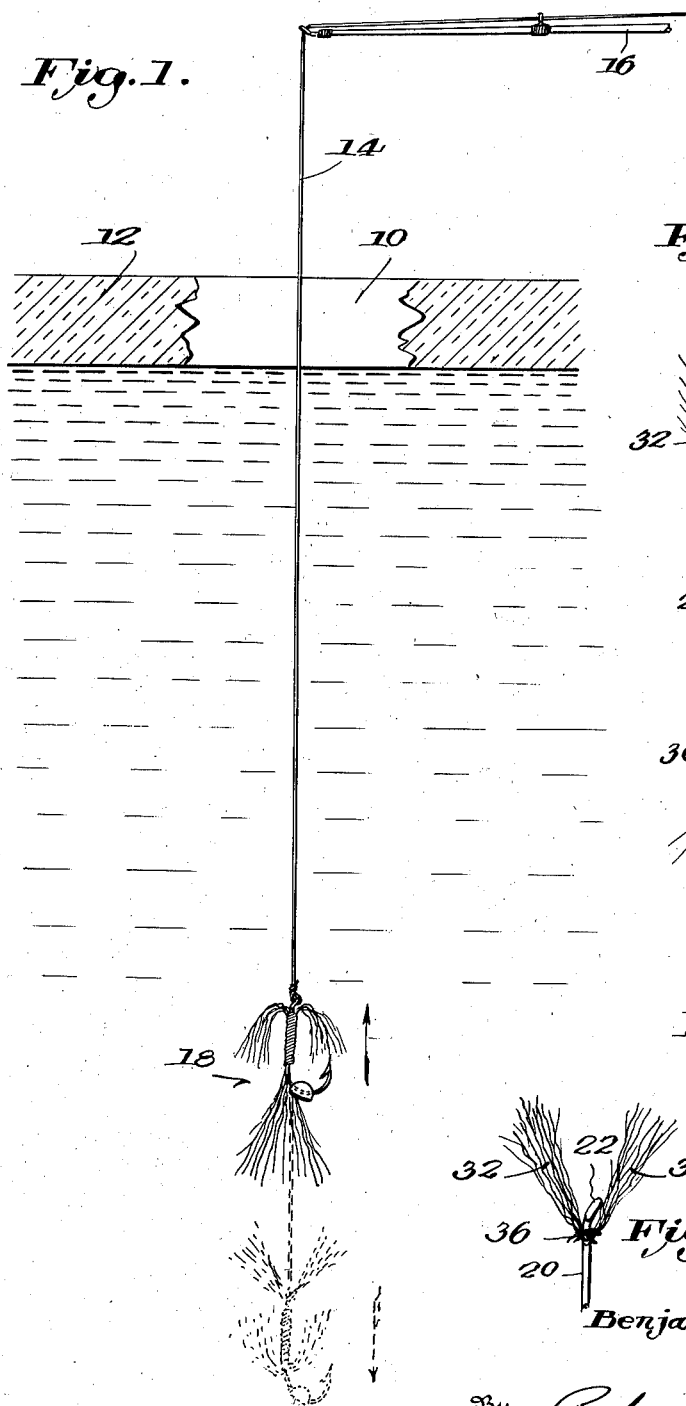
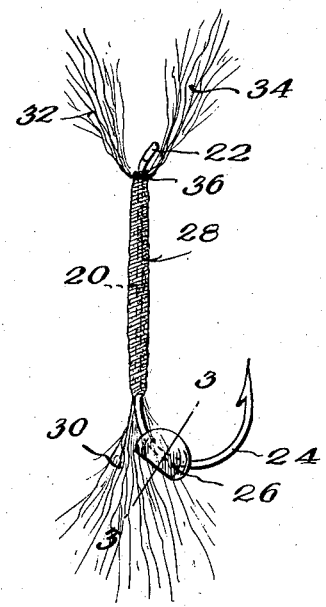
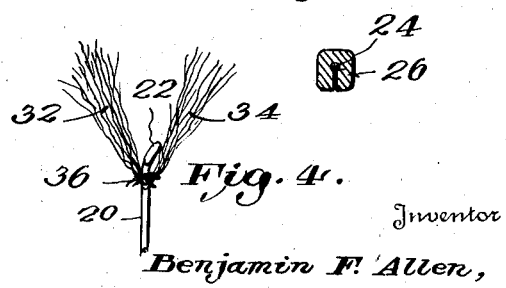
Inventor
Benjamin F. Allen,
By Richard L. Underwood
              Attorney Patented Dec. 23, 1941

2,267,487

UNITED STATES PATENT OFFICE 2,267,487

ICE FISHING LURE

Benjamin F. Allen, Drayton Plains, Mich.

Application June 24, 1940, Serial No. 342,173

4 Claims. (Cl. 43—54)

This invention relates to artificial bait of the type generally referred to as fishing lures or flies and has particular reference to an arrangement especially designed to facilitate fishing through ice.

As is commonly known, fishing through openings made in ice has developed from a mere sport to what, in many locations, is tantamount to a commercial business. Great impetus was given ice fishing when it was discovered some years ago that Mayfly larvae are killer baits.

An important object of this invention is to create an artificial bait or lure which, when used under the restricted conditions which inherently limit the efforts of an ice fisherman to make a strike, imitates the erratic action of a swimming larva, and thus obtain all the benefits and advantages of the natural bait which has proved so successful in this particular field.

It is obvious that, since no larger opening than is actually necessary is formed for the purpose of ice fishing, the range within which the leader to which the bait is attached can be manipulated is strictly limited. Regardless of whether a rod is used or the leader is simply held in the hand of the fisherman, the only movement that can be imparted to the bait or lure is in a substantially vertical direction. This is accomplished by simply jerking the leader up and down. The problem of so constructing and arranging the basic elements of hook, hackle and leader weight that the resulting lure accurately simulates the motion of a swimming larva under such restricted conditions as to the manner and scope of manipulating the leader has been successfully solved by my invention.

Various other objects and meritorious features of the invention will be apparent from the following description taken in conjunction with the drawing, wherein like numerals refer to like parts throughout the several figures, and wherein:

Fig. 1 illustrates two extreme positions of the lure in operation;

Fig. 2 is an enlarged elevation of the lure;

Fig. 3 is a section through 3—3 of Fig. 2, and

Fig. 4 illustrates a detail of lure construction.

Referring now to Fig. 1, wherein the numeral 10 represents an opening in the ice 12, the leader 14 has been shown for illustrative purposes as positioned by a suitable rod 16. The artificial lure constituting my invention is broadly illustrated in Fig. 1 by numeral 18 and is secured to the extreme end of the leader.

Referring now particularly to the lure itself as illustrated in detail in Figs. 2-4, it comprises a preferably metallic element including a relatively extended shank 20 having at one extremity an eye 22 to which the leader may be attached and a hook 24 at the other extremity. A weight 26, which may comprise a split shot as illustrated, is secured at substantially the juncture of the hook and the shank. This location is important for reasons to be more fully brought out hereafter. The shank is covered, preferably with spirally wound and attractively colored silk floss 28, and this winding is used to secure tail feathers 30 to the shank adjacent the hook extremity thereof in such manner that they extend outwardly away therefrom, as illustrated, and in normal position partially conceal the leader weight 26.

At the other end of the shank, adjacent the eye to which the leader is attached, wings 32 and 34 are formed by tying a sheaf of feathers in reverse so that the wings normally extend outwardly in diverging relation to one another and away from the extremity of the shank to which they are secured. The reverse tying of these wings constitutes an important feature of the invention inasmuch as it is to a large extent responsible for the accuracy with which the lure simulates the movement of a swimming larva when manipulated in a vertical direction by the fisherman.

As illustrated, the wings are formed by tightly bunching a sheaf of feathers at substantially its mid-point and securing such point to the end of the shank, as by means of thread 36. The individual feathers of each respective wing thus become separated or segregated from one another to form separate bushy feelers, as illustrated. This may be accomplished by tying the mid-point of the sheaf very tightly by means of the same thread used to secure it to the shank extremity, or two threads may be used, one for bunching the sheaf tightly at its mid-point and the other to tie the sheaf to the shank. As illustrated more particularly in Fig. 4, the so-called "reverse" formation of the wings is obtained by the manner in which the tying thread is associated with the sheaf of feathers at its point of securement to the shank. The tying thread is preferably shellacked after being wound and tied to insure against rupture. Webbed parts of the hackle, usually called "soft hackle," are used for both the tail and wings of the lure.

By reason of the fact that the weight is secured to the lure at substantially the juncture of the hook and the shank, it serves not only as a sinker but also to maintain the lure in substantially vertical position, with tail feathers lowermost, as it is moved up and down through manipulation of the leader. The tail feathers 30 cover the weight to a substantial extent when not forced back over the shank by the water as the lure descends. The wings 32 and 34 are extremely fluffy by reason of the manner in which they are reversely tied at the eye extremity of the shank, and the normal tendency of the positioning thread is to maintain them extending outwardly away from the shank in diverging relation from each other. As the leader is moved up and down the reversely tied wings and the tail feathers tremble in lifelike fashion and provide an extremely accurate and active imitation of the swimming larva.

Having described a preferred embodiment of my invention, various modifications of the details will be apparent to those skilled in the art, and for that reason I wish to limit myself only within the scope of the appended claims.

What I claim is:

1. A fish lure of the class described comprising a substantially straight elongated shank terminating in a hook, a weight secured at substantially the juncture of the hook and the shank whereby its gravity center is in substantial alinement with the shank, feathers so positioned and secured to opposite ends of the shank that normally they extend axially of the shank in opposite directions away from the respective ends to which they are secured, and threads wound about said shank to form a cover for and secure the feathers to the shank.

2. A fish lure of the class described comprising a substantially straight elongated shank terminating in a hook, a weight secured at substantially the juncture of the hook and the shank, tail feathers secured to the hook end of said shank and normally extending axially of the shank away from said end, and a sheaf of feathers bunched at the center and tied in reverse at substantially its mid-point to the opposite end of said shank.

3. A fish lure of the class described comprising a substantially straight elongated shank terminating in a hook, a weight secured at substantially the juncture of the hook and the shank, tail feathers secured at their ends to the hook end of said shank and normally extending axially of the shank away from said end, and wing feathers secured to the opposite end of said shank in such manner as normally to extend axially of the shank away therefrom in divergent relation to one another.

4. A fish lure of the class described comprising a substantially straight elongated shank terminating in a hook, a weight secured at substantially the juncture of the hook and the shank, tail feathers secured at their ends to the hook end of said shank and normally extending axially of the shank away from said end, and wing feathers secured to the opposite end of said shank in such manner that the wings normally extend axially of the shank away therefrom in divergent relation to one another, the feathers of each wing being bunched adjacent their point of securement to the shank and diverging from such point outward.

BENJAMIN F. ALLEN.